United States Patent [19]

Vosbikian

[11] Patent Number: 4,602,432
[45] Date of Patent: Jul. 29, 1986

[54] SHEAR WITH OFFSET CUTTING EDGE

[75] Inventor: Joseph Vosbikian, Cheltenham, Pa.

[73] Assignee: Hardward & Industrial Tool Co., Inc., Cinnaminson, N.J.

[21] Appl. No.: 539,657

[22] Filed: Oct. 17, 1983

[51] Int. Cl.⁴ ............................................. B26B 13/06
[52] U.S. Cl. ........................................ 30/258; 30/271
[58] Field of Search ................ 30/258, 191, 124, 134, 30/135, 186, 187, 188, 248, 249, 271

[56] References Cited

U.S. PATENT DOCUMENTS

| | | | |
|---|---|---|---|
| 68,280 | 8/1867 | Binder | 30/258 |
| 112,392 | 3/1871 | Smiley | 30/258 X |
| 1,091,607 | 3/1914 | Weaver | 30/258 |
| 2,715,270 | 8/1955 | Oxhandler | 30/258 X |
| 2,721,386 | 10/1955 | Habart | 30/258 |

FOREIGN PATENT DOCUMENTS 28610 of 1910 United Kingdom ................ 30/186

Primary Examiner—Jimmy C. Peters
Attorney, Agent, or Firm—Steele, Gould Fried

[57] ABSTRACT

A pruning shear with offset cutting blade is disclosed which includes in combination a pair of pivotally interacting blades which are capable of closing upon one another to sever a twig or small branch. A first blade is designed as a cutting blade having one side ground to form a gradually sloped first bevel. A more sharply sloped second bevel angularly intersects the first bevel to define an offset cutting edge. The second blade is provided with a pair of laterally spaced support anvils, which anvils define a clearance space to receive therein at least the cutting portions of the cutting blade. The cutting edge of the pruning shear cutting blade is pivotally movable into the clearance space in a manner to always position the cutting edge in spaced relationship to each of the support anvils.

1 Claim, 8 Drawing Figures

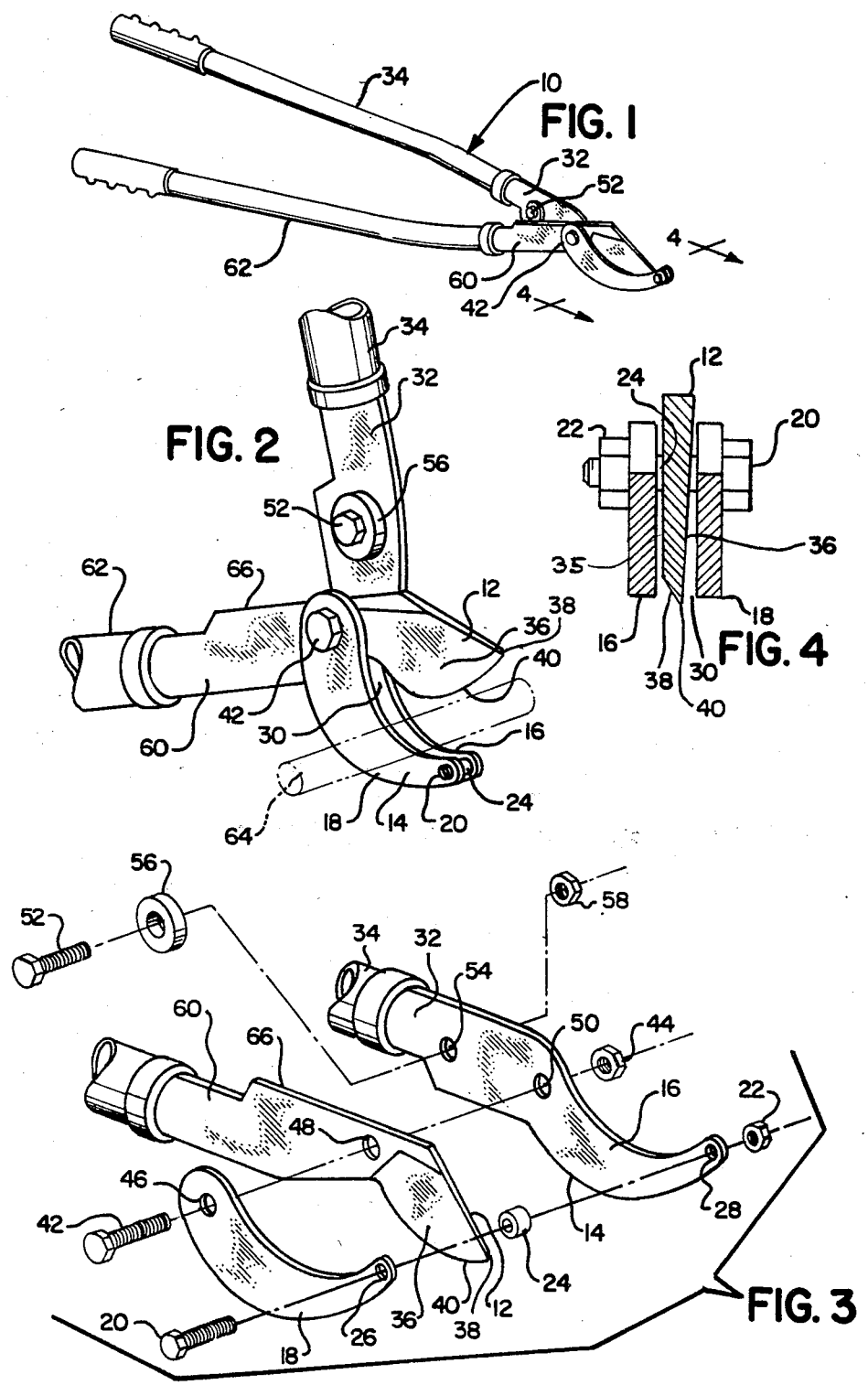

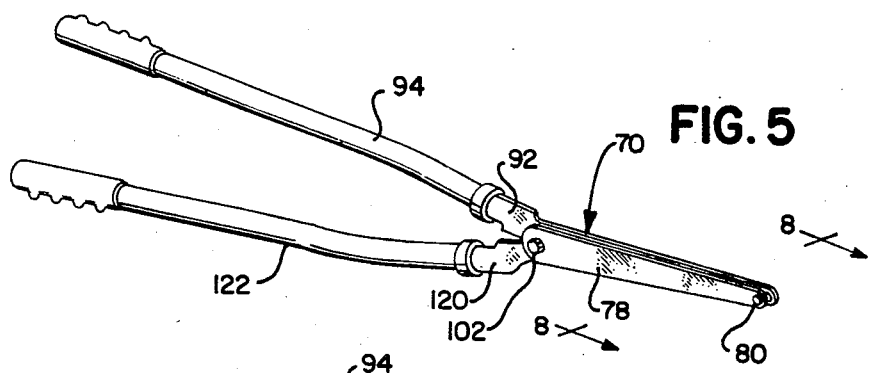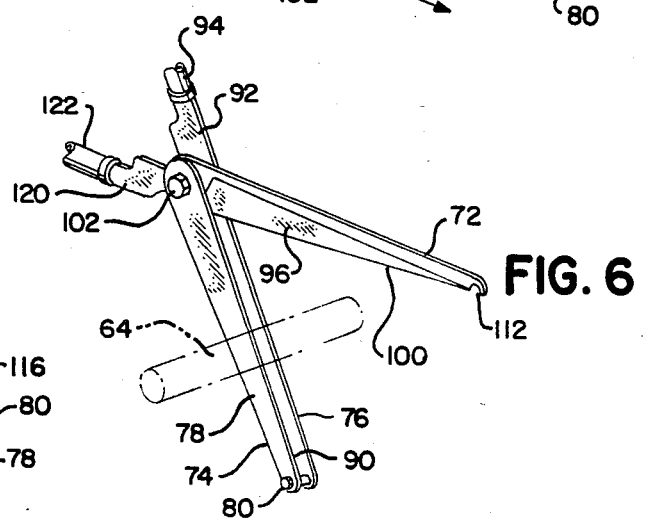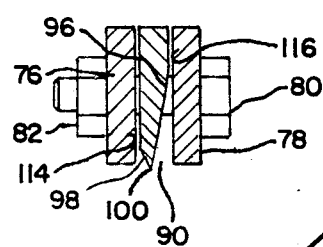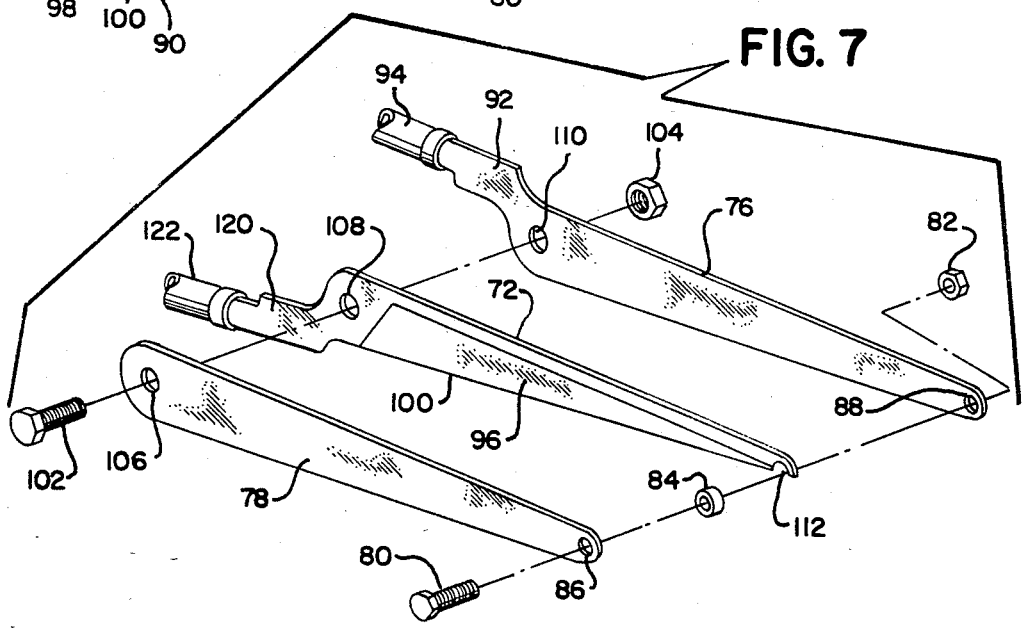

SHEAR WITH OFFSET CUTTING EDGE

FIELD OF INVENTION

The present invention relates generally to the field of hand garden tools, and more particularly, relates to a double anvil type of pruning shears wherein the cutting edge is formed by a cooperating pair of intersecting bevels.

BACKGROUND OF THE INVENTION

Garden tools such as pruning shears have long been available for use in and about the garden for pruning purposes, for example, for cutting twigs, small branches, stems and the like. For relatively thick or sturdy twigs and small branches, it is the usual practice to apply elongated handles to the tools to thereby increase leverage and thus make the cutting chore easier.

Most presently available pruning shears are provided with a cutting blade and an anvil in pivotal relationship whereby the cutting or pruning is accomplished by applying the twig to be cut between the blade portion and the anvil portion and then squeezing the handles together with sufficient force to accomplish the desired cutting or pruning. It has been found that the very pressure required for cutting forced the cutting edge of the blade directly into the anvil once the twig or small branch was cut, thereby dulling the cutting edge due to the direct contact. Usually, the cutting edge was fatricated with a single bevel and then ground to provide a finished edge.

Additionally the prior art pruning shear designs required that the pivotally moving portions had to be maintained in relatively precise, tight alignment to discourage any tendency to chew, rather than cut, the material being severed. This requirement for precision at the area of interaction between the moving parts has resulted in increased manufacturing and maintenance costs in order to insure a properly working instrument. Additionally, due to the repeated impacts of the cutting edge upon the anvil, constant sharpening of the blade must be anticipated. Accordingly, the need remains to design a simple and inexpensive shear that is capable of long life without requiring precise manufacturing techniques or constant sharpening procedures.

SUMMARY OF THE INVENTION

The present invention relates generally to an improved type of garden shear, and more particularly, incorporates a double bevel blade design in combination with an auxiliary anvil to aid in the improved operation of the shear.

In accordance with the teachings of the present invention, a second anvil or support piece is furnished in spaced relationship from a conventional first anvil to provide both a dual support for the twig to be severed, and a clearance space to receive the cutting edge of the pivotally movable blade. The second anvil or support piece provides a second, spaced support for the twig or branch during cutting and thereby functions to discourage any tendency of the branch to angularly cock in response to forces applied as the cutting edge is urged through the branch and towards the anvil. Further, the spaced, double anvil design allows sufficient clearance to eliminate any tendency of the tool to clog.

The blade of the pruning shears of the present invention is fabricated of double, angularly intersecting bevels in a manner to space the cutting edge inwardly from either of the first or second anvils. The interior position of the cutting edge intermediate the first and second anvils produces an entirely novel and improved method of pruning shear operation. Rather than cutting a branch or twig by a shearing action as was inherent in the prior art designs, the pruning shears of the present invention function to sever the branch by a chopping action. The intersecting cutting edge bevels produce forces that work against each other and thereby neutralize any tendency to misalign the working parts during cutting. In this manner, many precision manufacturing operations that previously were required to produce a satisfactory pruning shear can now be eliminated.

In accordance with the present design, it is now only required to grind one good bevel in the cutting blade. The angularly intersecting second bevel is easy to fabricate and is relatively simple to apply without the precision and cost previously required by extensive fine grinding procedures.

It is therefore an object of the present invention to provide an improved pruning shear of the type set forth.

It is another object of the present invention to provide a novel shear with offset cutting edge which comprises a cutting blade having an offset cutting edge formed by two intersecting bevels.

It is another object of the present invention to provide a novel shear with offset cutting edge comprising a support blade formed of a pair of spaced anvils and a pivotally movable cutting blade having a cutting edge, the cutting edge being spaced inwardly from each of the spaced anvils whereby the cutting edge never contacts either anvil.

It is another object of the present invention to provide a novel shear with offset cutting edge comprising a pair of first and second blades arranged in pivotal relationship, the first blade being formed with first and second angularly intersecting bevels to define a cutting edge, the second blade comprising first and second anvils in spaced relationship, the cutting edge being positioned in spaced relationship from both the first and second anvils when the first and second blades are pivoted together for branch cutting purposes.

It is another object of the present invention to provide a novel shear with offset cutting edge that is simple in design, inexpensive in manufacture and trouble free when in use.

Other objects and a fuller understanding of the invention will be had by referring to the following description and claims of a preferred embodiment thereof, taken in conjunction with the accompanying drawings wherein like reference characters refer to similar parts throughout the several views and in which:

BRIEF DESCRIPTION OF THE DRAWINGS

FIG. 1 is a perspective view of a pruning shear with offset cutting edge constructed in accordance with the present invention.

FIG. 2 is an enlarged, perspective view of the cutting blade and double anvil construction of the pruning shear of FIG. 1.

FIG. 3 is an exploded perspective view of the cutting blade and double anvil construction of FIG. 2.

FIG. 4 is an enlarged, cross sectional view taken along line 4—4 on FIG. 1, looking in the direction of the arrows.

FIG. 5 is a perspective view of another embodiment of a pruning shear with offset cutting edge.

FIG. 6 is an enlarged, perspective view of the cutting blade and double anvil construction of the pruning shear of FIG. 5.

FIG. 7 is an enlarged, perspective view of the parts illustrated in FIG. 6.

FIG. 8 is an enlarged cross sectional view taken along line 8—8 on FIG. 5, looking in the direction of the arrows.

DESCRIPTION OF THE PREFERRED EMBODIMENT OF THE INVENTION

Although specific terms are used in the following description for the sake of clarity, these terms are intended to refer only to the particular structure of the invention selected for illustration in the drawings, and are not intended to define or limit the scope of the invention.

Referring now to the drawings, there is illustrated in FIGS. 1-4 a pruning or lopping shears 10 comprising generally a cutting blade 12 and an anvil blade 14, which blades are pivotally arranged respective to each other for pivotal movement about the fulcrum bolt 42. The cutting blade 12 extends rearwardly of the bolt 42 in an integral blade extension 60. Similarly, the anvil blade 14 extends rearwardly of the fulcrum bolt 42 in an integral anvil blade extension 32. The operating handles 34,62 conventionally affix respectively to the blade extensions 32,60 to provide the required leverage for easy operation in known manner.

As best seen in FIGS. 2 and 3, the anvil blade 14 comprises an arcuate anvil 16, which anvil integrally connects to the rearwardly positioned anvil blade extension 32. An anvil support piece 18 cooperates with and is spaced from the anvil 16 to aid in securing and supporting a branch or twig 64 during the branch cutting operation. Preferably, both the anvil 16 and the support piece 18 are similar in configuration and are arcuately curved to aid in gripping the branch 64 during cutting and to discourage movement of the branch along the cutting blade 12.

As illustrated, the support piece 18 is provided with a rear opening or hole 46 of size adequate to receive the shank of the fulcrum bolt 42 therethrough. In this manner, a single bolt 42 serves the dual purposes of providing a pivotal interconnection between the anvil blade 14 and the cutting blade 12 and securing one end of the anvil support piece 18 in a fixed relationship to the anvil 16. The forward end of the support piece is also provided with an opening 26 to receive therethrough the shank of a connecting bolt 20. As best seen in FIG. 3, the front end of the anvil 16 is also provided with a hole 28 of size to receive the shank of the bolt 20 therethrough. A spacer 24 positions intermediate the respective front ends of the anvil 16 and the support piece 18 and receives the shank of the bolt 20 therethrough in the usual manner. A conventional nut 22 threadedly engages the bolt 20 to secure the parts together.

Still referring to FIG. 3, the anvil blade 14 and the cutting blade 12 are provided with laterally aligned pivot openings 50,38 to pivotally interconnect the blades 12,14 about the fulcrum bolt 42. A nut 44 is provided to threadedly engage the bolt 42 to pivotally secure the parts together in known manner. In a preferred construction, the anvil blade extension 32 is drilled or otherwise treated to provide an opening 54 to receive a stop bolt 52 therein. A suitable washer 56 and nut 58 complete the stop bolt assembly. As illustrated in FIG. 1, the washer 56 is positioned to engage a portion of the top surface 66 of the cutting blade extension 60 to limit the pivotal rotation of the cutting blade 12 relative to the anvil blade 14.

Referring now to FIGS. 3 and 4, it will be observed that the cutting blade 12 is pivotal into the clearance space 30 which is defined between the anvil 16 and the anvil support piece 18. Thus, when cutting a branch or twig 64, the branch will be supported in two spaced positions by the anvil 16 and support piece 18 to thereby form a firm support to resist the forces of impact generated when the cutting blade cutting edge 40 contacts the branch 64. A first, large bevel 36 is ground in one face of the cutting blade 12 at a relatively gentle angle in accordance with known blade grinding techniques. A second bevel 38 of much sharper angularity is ground in the opposite face of the cutting blade 12 to define the cutting edge 40 at the arc of intersection of the first and second bevels 36,38. As best seen in FIG. 4, the angularity of the sharp or second bevel 38 assures that the cutting edge 40 will always be inwardly spaced from the adjacent anvil 16 and anvil support 18. In this manner, even if the parts 12,14 should work loose relative to each other, the cutting edge 40 will always be inwardly spaced from the anvil 16 and anvil support 18. Thus the cutting edge 40 will always be protected from being dulled by direct contact on anvil 16 or anvil support 18.

Further, still referring to FIG. 4, it will be observed that the bevels 36,38 are oppositely facing to thereby work against each other to develop forces to balance or neutralize the cutting forces when the cutting edge 40 is brought to bear against the branch 64. The balanced or neutralized blade cutting forces, in combination with the laterally spaced supports, provided by the spaced anvil 16 and anvil support piece 18 produces a highly efficient chopping action in the pruning shear 10, rather than a shearing action as inherent in prior art shear designs. In this manner all tendency not to cut cleanly through the branch 64 will be discouraged by the function of the chopping.

It is noteworthy in FIG. 4, that the face 35 of the cutting blade 12 that is opposite the ground bevel 36 is not ground or otherwise treated, except near the bottom wherein the second bevel 38 is provided to form the cutting edge 40. Thus, the blade face 35 will be parallel to a longitudinal axial plane drawn through the cutting blade 12.

Referring now to FIGS. 5-9, a second embodiment of a pruning shears 70 is illustrated. In this embodiment, the cutting blade 72 and anvil blade 74 are shown in elongated, triangular configuration. A fulcrum bolt 102 positions laterally through the blade pivot openings 108,110 to pivotally engage the cutting and anvil blades 72,74. A nut 104 threadedly engages the shank of the bolt 102 to secure the parts together. As shown, the cutting blade 72 terminates rearwardly in an integral cutting blade extension 120. The anvil 76 of the anvil blade 74 terminates rearwardly in an integral anvil blade extension 92. The blade extensions 92,120 receive and secure the handles 94,122 in any well known manner.

As best seen in FIG. 7, the anvil blade 74 comprises an anvil 76 and a laterally spaced, affixed anvil support piece 78. A bolt 80, positioned respectively through the forward support piece and the forward anvil openings 86,88, secures the forward ends of the parts together by utilizing a nut 82 and spacer 84 in the manner illustrated and as previously described in connection with the embodiment of FIG. 3. The cutting blade 72 terminates forwardly in a semi-circular stop notch 112 of size, configuration and position to engage and stop against the spacer 84. If desired, either or both the anvil 76 and anvil support piece 78 may be provided with scalloped edges to aid in holding the branch 64 during the branch cutting operation.

Referring now to FIGS. 7 and 8, it will be observed that the cutting blade 72 is pivotal into the clearnace space 90 which is defined between the anvil 76 and the anvil support piece 78 of the anvil blade 74 when the blades are pivoted together about the fulcrum bolt 102 as the shears 70 is employed to sever a branch or twig 64. Inasmuch as the cutting edge 100 of the cutting blade 72 never contacts either the anvil 76 or anvil support piece 78, there will be no tendency to dull the tool during the cutting operations.

As best seen in FIG. 8, and as partially shown in FIGS. 6 and 7, the cutting blade 72 is ground or otherwise worked on one side to provide a first, gently angled, finely ground bevelled surface 96. The second or reverse side of the cutting blade 72 is ground or otherwise worked to provide a second bevel 98 of angular inclination that is much greater than the angular inclination of the first ground surface 96. The angular intersection of the first ground bevel 96 and the second ground bevel 98 defines the cutting edge 100. As shown, the cutting edge 100 is spaced inwardly from the respective interior surfaces 114,116 of the anvil 76 and of the anvil support piece 78. The opposite inclination of the angularly inclined first and second ground bevels 96,98 serves to neutralize any tendency of the forces generated during the branch or twig severing operations to laterally push the cutting blade 72 relative to the anvil blade 74. Accordingly, the cutting edge 100 is always movable within the clearance space 90 and will not be forced into contact or engagement with either the anvil 76 or anvil support piece 78 to thus dull the cutting edge 100.

Although the present invention has been described with reference to the particular embodiments herein set forth, it is understood that the present disclosure has been made only by way of example and that numerous changes in the details of construction may be resorted to Without departinq from the spirit and scope of the invention. Thus the scope of the invention should not be limited by the foregoing specification, but rather only by the scope of the claims appended hereto.

What is claimed is:

1. In a pruning shear of the type comprising a cutting blade and an anvil blade in pivotal relationship about a fulcrum bolt wherein the cutting blade has first and second faces positioned respectively on either side of a longitudinal plane drawn through the center of the cutting blade, the improvement comprising a first, large bevel formed in the first face of the cutting blade, the first bevel being offset from the longitudinal plane by a first relatively gentle angle;

a second small bevel formed in the second face of the cutting blade, the second bevel being angularly offset from the longitudinal plane by a second relatively sharp angle, the second angle being offset from the plane by an angle that is much greater than the angle of offset from the from the plane of the first angle, the second angle intersecting the first angle to define a sharp cutting edge in the cutting blade, the cutting edge being medially positioned on the cutting blade and in alignment with the said cutting blade longitudinal plane, the anvil blade comprising an anvil and an anvil support piece in spaced relationship to the anvil, the anvil and the anvil support piece defining a clearance space therebetween, the anvil support piece comprising a front and a rear, the rear comprising an opening to receive the said fulcrum bolt, the front of the anvil support piece comprising means to secure the anvil support to the anvil and spacer means interposed between the anvil and the anvil support piece to define a clearance space therebetween; and stop means interposed between the anvil blade and the cutting blade to limit the pivotal movement of one blade relative to the other, the stop means comprising a notch in the cutting blade, the notch being adapted to engage the spacer means to limit the pivotal movement of one blade relative to the other.

* * * * *